United States Patent [19]

McCormick

[11] Patent Number: 5,575,358
[45] Date of Patent: Nov. 19, 1996

[54] MOLDED PISTON HAVING METALLIC COVER FOR DISC BRAKE ASSEMBLY

[75] Inventor: Christopher O. McCormick, Plymouth, Mich.

[73] Assignee: Kelsey-Hayes Company, Romulus, Mich.

[21] Appl. No.: 292,151

[22] Filed: Aug. 17, 1994

[51] Int. Cl.[6] ............................. F16J 1/01; F16D 65/24
[52] U.S. Cl. ............................. 188/71.6; 188/264 G
[58] Field of Search .................. 188/264 G, 72.4, 188/71.6; 92/248

[56] References Cited

U.S. PATENT DOCUMENTS

| | | | |
|---|---|---|---|
| 4,306,489 | 12/1981 | Driver et al. | 92/248 |
| 4,401,012 | 8/1983 | Emmett | 92/248 |
| 4,449,447 | 5/1984 | Yanagi | 92/248 |
| 4,513,844 | 4/1985 | Hoffman, Jr. | 188/264 G |
| 4,581,985 | 4/1986 | Villata | 92/248 |
| 4,649,806 | 3/1987 | Hartsock | 92/248 |
| 4,928,579 | 5/1990 | Emmett | 92/248 |

FOREIGN PATENT DOCUMENTS

| | | | |
|---|---|---|---|
| 57-18857 | 1/1982 | Japan . | |
| 2165902 | 4/1986 | United Kingdom | 188/264 G |

OTHER PUBLICATIONS

Drawing No. DM-52-HW-4149, dated Dec. 13, 1989.
Drawing Name "Insert DM-52", dated Dec. 13, 1989.

*Primary Examiner*—Matthew C. Graham
*Attorney, Agent, or Firm*—MacMillan, Sobanski & Todd

[57] ABSTRACT

A disc brake piston includes a body formed from a plastic material and a cover formed from a metallic material. The body of the piston is molded from a synthetic resin material and is generally hollow and cylindrical in shape, defining an axis and including an opened end and a closed end. The body defines an inner cylindrical surface and an outer cylindrical surface which extend axially from the opened end toward the closed end. The cover is formed from steel and is integrally molded about the open end of the body. The cover extends about the open end of the body and extends axially inwardly toward the closed end along portions of both the inner and outer surfaces of the body.

20 Claims, 2 Drawing Sheets

MOLDED PISTON HAVING METALLIC COVER FOR DISC BRAKE ASSEMBLY

BACKGROUND OF THE INVENTION

This invention relates in general to vehicle disc brake assemblies and in particular to an improved structure for a piston adapted for use in such a vehicle disc brake assembly.

Most vehicles are equipped with a brake system for retarding or stopping movement of the vehicle in a controlled manner. A typical brake system for an automobile or light truck includes a disc brake assembly for each of the front wheels and either a drum brake assembly or a disc brake assembly for each of the rear wheels. The brake assemblies are actuated by hydraulic or pneumatic pressure generated when an operator of the vehicle depresses a brake pedal. The structures of these drum brake assemblies and disc brake assemblies, as well as the actuators therefor, are well known in the art.

A typical disc brake assembly includes a rotor which is secured to the wheel of the vehicle for rotation therewith. A caliper assembly is slidably supported by pins secured to an anchor plate. The anchor plate is secured to a non-rotatable component of the vehicle, such as the vehicle frame. The caliper assembly includes a pair of brake shoes which are disposed on opposite sides of the rotor. The brake shoes are operatively connected to one or more hydraulically actuated pistons for movement between a non-braking position, wherein they are spaced apart from opposed axial sides or braking surfaces of the rotor, and a braking position, wherein they are moved into frictional engagement with the opposed braking surfaces of the rotor. When the operator of the vehicle depresses the brake pedal, the piston urges the brake shoes from the non-braking position to the braking position so as to frictionally engage the opposed braking surfaces of the rotor and thereby slow or stop the rotation of the associated wheel of the vehicle.

A considerable amount of heat is generated between the rotor and the brake shoes during braking. In a disc brake assembly having a piston constructed from a metallic material, the heat generated during braking will not usually damage the surface of the open end of the piston. Unfortunately, a disc brake piston which is formed from a metallic material is relatively expensive. It is less expensive to manufacture a disc brake piston from a plastic material than from a metallic material. U.S. Pat. No. 4,928,579 to Emmett, U.S. Pat. No. 4,449,447 to Yanagi, U.S. Pat. No. 4,401,012 to Emmett, and Japanese Patent No. 5718857 disclose prior art disc brake pistons. However, it has been found that the heat generated during braking can damage the surface of a piston formed from a plastic material. Thus, it would be desirable to provide an improved structure for a piston adapted for use in a vehicle disc brake assembly which is durable, yet relatively inexpensive to manufacture.

SUMMARY OF THE INVENTION

This invention relates to an improved structure for a piston adapted for use in a vehicle disc brake assembly which is durable, yet relatively inexpensive to manufacture. The piston includes a generally hollow cylindrical body having an opened end and a closed end. The body is formed from a plastic material and includes inner and outer cylindrical surfaces which extend axially between the opened end and the closed end. A generally annular steel cover is integrally molded about the opened end of the cylindrical body. The cover extends over an annular end surface of the open end of the body and axially toward the closed end along portions of both the inner and outer cylindrical surfaces. The cover includes a plurality of tangs provided on an inner side wall thereof to assist in securing the cover to the piston when the piston in molded thereabout. The cover is formed from a metallic material so as to protectively shield the enclosed portions of the plastic body from the heat generated during braking. Also, the cover uniformly distributes the load across the annular end surface of the piston to reduce the force concentrations thereon.

Various objects and advantages of this invention will become apparent to those skilled in the art from the following detailed description of the preferred embodiment, when read in light of the accompanying drawings.

DESCRIPTION OF THE PREFERRED EMBODIMENT

Figure 1:
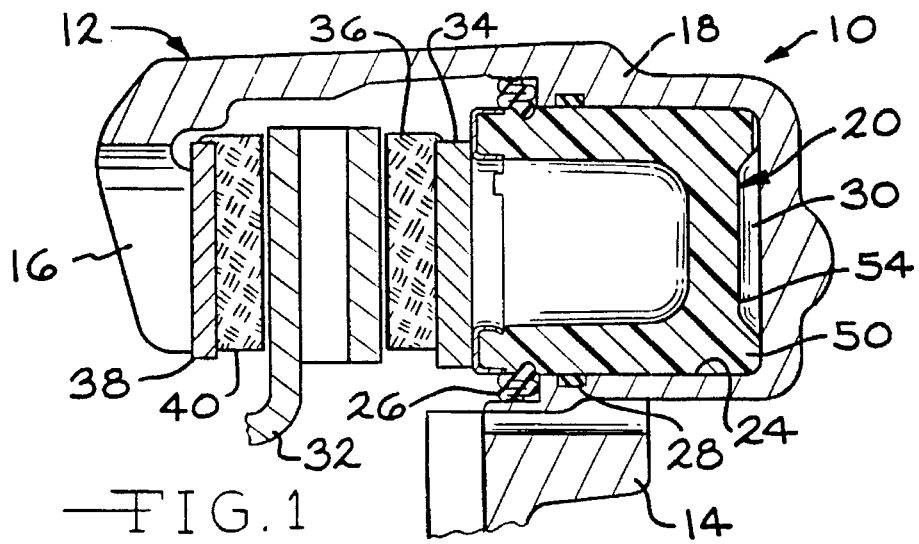
FIG. 1 is a sectional elevational view of a portion of a vehicle disc brake assembly including an improved disc brake piston in accordance with this invention.

Referring now to the drawings, there is illustrated in FIG. 1 a portion of a vehicle disc brake assembly, indicated generally at 10. The general structure and operation of the disc brake assembly 10 is conventional in the art. Thus, only those portions of the disc brake assembly 10 which are necessary for a full understanding of this invention will be explained and illustrated. Although this invention will be described and illustrated in conjunction with the particular vehicle disc brake assembly disclosed herein, it will be appreciated that this invention may be used in conjunction with other disc brake assemblies.

The disc brake assembly 10 includes a generally C-shaped caliper, indicated generally at 12. The caliper 12 includes an inboard leg portion 14 and an outboard leg portion 16 which are interconnected by an intermediate bridge portion 18. The caliper 12 is slidably supported on pins (not shown) extending outwardly from an anchor plate (not shown) which, in turn, is secured to a stationary component of the vehicle. The pins permit the caliper 12 to slide in both the outboard direction (left when viewing FIG. 1) and the inboard direction (right when viewing FIG. 1). Such sliding movement of the caliper 12 occurs when the disc brake assembly 10 is actuated, as will be explained below.

An actuation means, indicated generally at 20, is provided for effecting the operation of the disc brake assembly 10. The actuation means 20 includes a piston, indicated generally at 50, which is disposed in a counterbore or recess 24 formed in the outboard surface of the inboard leg 14 of the caliper 12. The actuation means 20, shown in this embodiment as being a hydraulic actuation means, is operable to reciprocally move the piston 50 within the recess 24. However, other types of actuation means 20, such as for example, electrical and mechanical types, can be used. The structure of the piston 50 will be described in detail below.

The disc brake assembly 10 also includes a dust boot seal 26 and an annular fluid seal 28. The dust boot seal 26 is formed from a flexible material and has a first end which engages an outboard end of the recess 24. A second end of the dust boot seal 26 engages an annular groove formed in an outer side wall of the piston 50. A plurality of flexible convolutions are provided in the dust boot seal 26 between the first and second ends thereof. The dust boot seal 26 is provided to prevent water, dirt, and other contaminants from entering into the recess 24. The fluid seal 28 is disposed in an annular groove formed in a side wall of the recess 24 and engages the outer side wall of the piston 50. The fluid seal 28 is provided to define a sealed hydraulic actuator chamber 30, within which the piston 50 is disposed for sliding movement.

The disc brake assembly 10 further includes a rotor 32, which is connected to a wheel (not shown) of the vehicle for rotation therewith. The rotor 32 extends radially outwardly between an inboard backing plate 34, which supports an inboard friction pad 36, and an outboard backing plate 38, which supports an outboard friction pad 40. The inboard and outboard backing plates 34 and 38, respectively, can be supported on guide rails (not shown) provided on the anchor plate. Alternatively, the inboard backing plate 34 can be supported on the piston 50, while the outboard backing plate 38 can be supported on the outboard leg portion 16 of the caliper 12.

When it is desired to brake the rotation of the brake rotor 32 and the vehicle wheel associated therewith, pressurized hydraulic fluid is introduced into the chamber 30. Such pressurized hydraulic fluid urges the piston 50 in the outboard direction (toward the left when viewing FIG. 1). As a result, the inboard friction pad 36 is moved into engagement with an inboard braking surface of the rotor 32. At the same time, the caliper 12 slides in the inboard direction (toward the right when viewing FIG. 1) such that the outboard friction pad 40 is moved into engagement with an outboard braking surface of the brake rotor 32. As a result, the friction pads 36 and 40 frictionally engage the opposed axial sides of the rotor 32 to retard relative rotational movement thereof. The structure and operation of the disc brake assembly 10 thus far described is conventional in the art.

Figure 3:
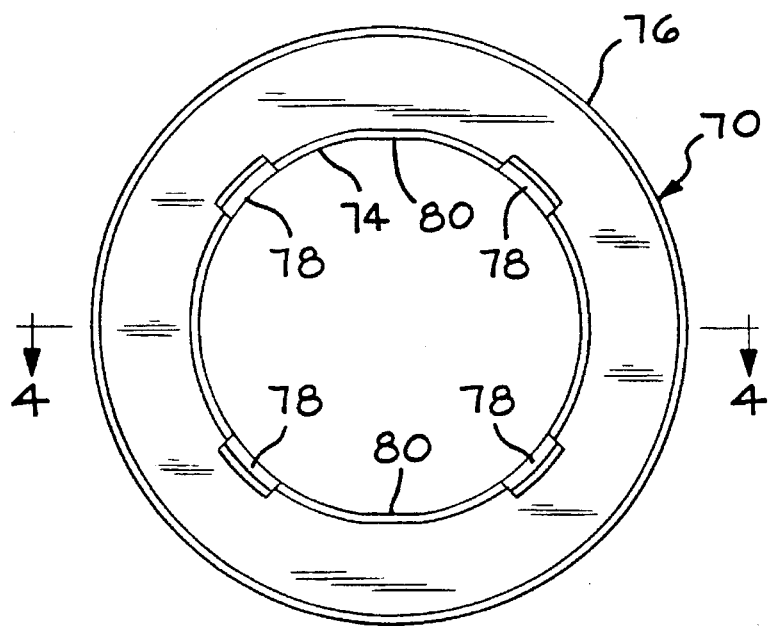
FIG. 3 is an elevational view of the end of the cover provided on the piston illustrated in FIGS. 1 and 2.
Figure 4:
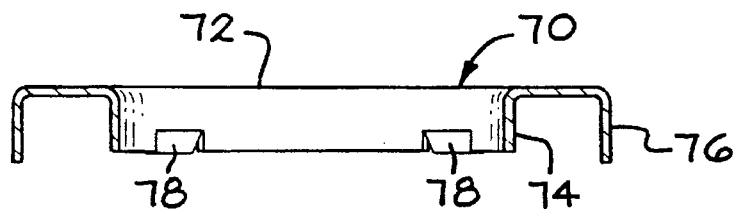
FIG. 4 is a sectional elevational view of the cover taken along line 4—4 of FIG. 3.
Figure 2:
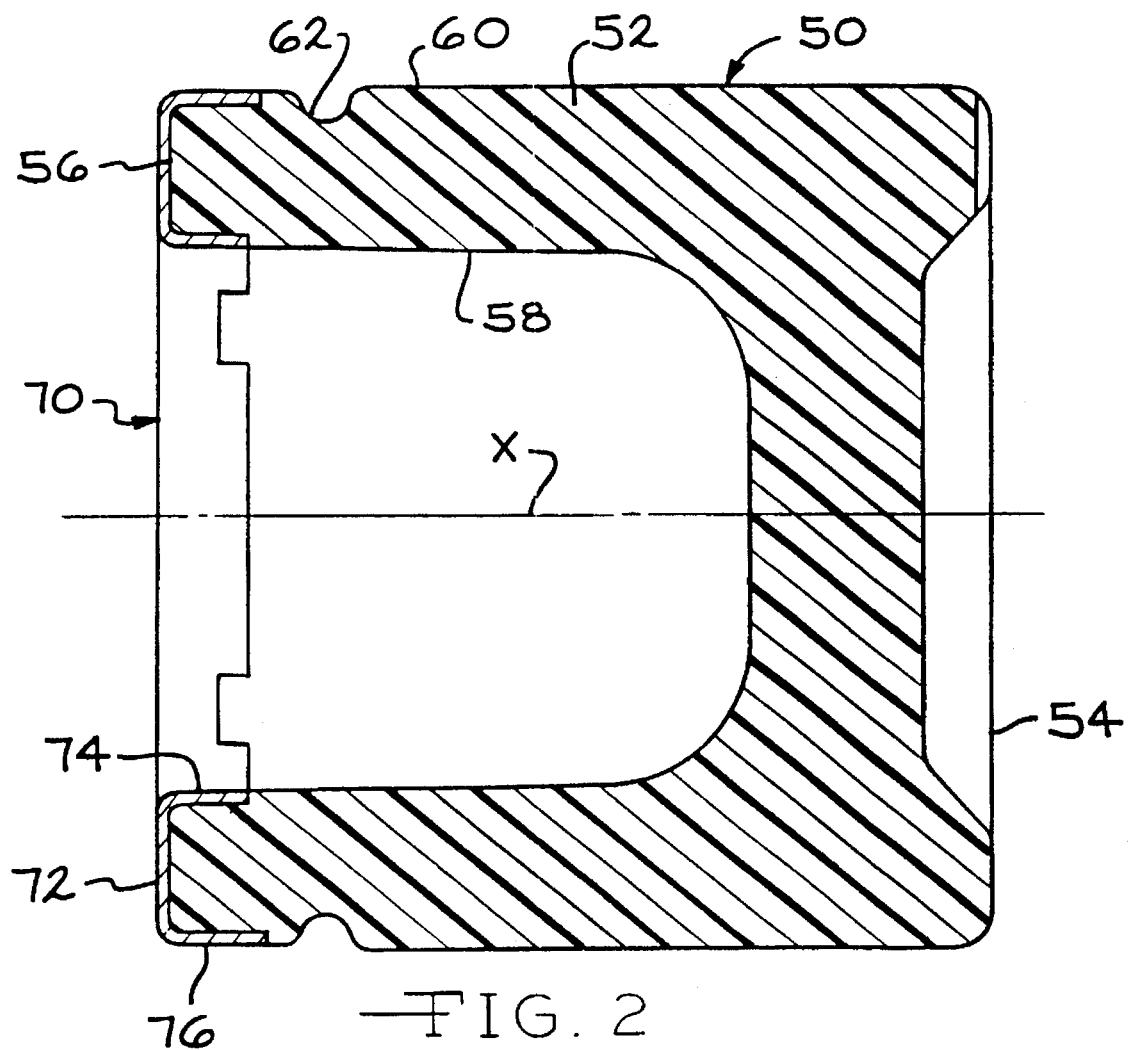
FIG. 2 is an enlarged sectional elevational view of the disc brake piston illustrated in FIG. 1.

Referring now to FIGS. 2 through 4, the structure of the piston 50 is illustrated in detail. As shown therein, the piston 50 includes a body 52 which is preferably molded from a synthetic resin material. However, the piston 50 can be formed from other materials, such as for example, ceramic. The body 52 of the piston 50 is generally hollow and cylindrical in shape, having a closed end 54 and an opened end 56. An axially extending inner cylindrical surface 58 and an axially extending outer cylindrical surface 60 are defined on the body 52 of the piston 50. The inner cylindrical surface 58 and the outer cylindrical surface 60 of the body 52 are preferably concentric with a longitudinal axis X of the piston 50. An annular groove 62 may be formed in the outer cylindrical surface 60 of the body 52 adjacent to the opened end 56 thereof. The groove 62 is adapted to receive the second end of the dust boot seal 26 therein, as described above.

A generally annular cover 70 is integrally molded about the opened end 56 of the body 52 of the piston 50. The cover 70 includes an end wall 72, an inner cylindrical side wall 74, and an outer cylindrical side wall 76. The end wall 72 defines an annular abutment surface which is oriented perpendicular to the longitudinal axis X of the piston 50. The abutment surface 72 is adapted to engage the inboard backing plate 34 when the chamber 30 is pressurized to cause the piston 50 to slide toward the rotor 32, as described above. The cover 70 is preferably formed from stainless steel or carbon steel, and may be electroplated with zinc for corrosion protection. However, the cover 70 can be formed from other materials which are different from the material of the piston 50, such as for example, aluminum.

As best shown in FIGS. 3 and 4, a plurality of angled "tangs" 78 are formed on the inner cylindrical side wall 74 of the cover 70. As used herein, a tang is defined as a projection having a portion which extends from the inner cylindrical side wall 74 toward the outer cylindrical side wall 76. In the illustrated embodiment, four equidistantly spaced angled tangs 78 which extend radially outwardly and axially inwardly are provided on the cover 70. However, the number and spacing of the tangs 78 may be varied as desired. In addition, the configuration of the tangs 78 may be other than illustrated. For example, the tangs 78 can be curved, stepped, or L-shaped.

Preferably, the tangs 78 are angled in the range of 30 degrees to 60 degrees relative to the axis X, with approximately 45 degrees being the preferred angle. However, the tangs 78 can be angled in the range of 5 to 85 degrees. When the plastic body 52 of the piston 50 is molded about the cover 50, the tangs 78 are embedded therein as best shown in FIG. 2. Thus, the tangs 78 assist in mechanically securing the cover 70 to the piston 50 when the body 52 of the piston 50 is molded thereabout.

In addition to the tangs 78, a plurality of flats 80 are formed on the inner side wall 76 of the cover 70. In the illustrated embodiment, two equidistantly spaced flats 80 are formed on the cover 70. However, the number and spacing of the flats 80 may be varied as desired. The flats 80 are provided for assisting in the accurate positioning of the cover 70 within the mold when the body 52 of the piston 50 is molded thereabout.

In accordance with the provisions of the patent statutes, the principle and mode of operation of this invention have been described and illustrated in its preferred embodiment. However, it must be understood that this invention may be practiced otherwise than as specifically explained and illustrated without departing from its spirit or scope.

What is claimed is:

1. A piston adapted for use in a brake assembly comprising:

a cover formed from a first material, said cover including an end wall having an inner edge and an outer edge, an inner side wall extending from said inner edge, and an outer side wall extending from said outer edge; and a hollow piston body formed from a second material, said piston body including an open end, a closed end, an inner surface extending between said open end and said closed end, and an outer surface extending between said open end and said closed end, said open end, said inner surface, and said outer surface of said piston body being integrally molded to said cover such that said end wall of said cover is covered by said open end of said piston body, said inner side wall of said cover is covered by a portion of said inner surface of said piston body, and said outer side wall of said cover is covered by a portion of said outer surface of said piston body.

2. The piston defined in claim 1 wherein said cover includes at least one tang provided on one of said end wall, said inner side wall, and said outer side wall thereof, said tang being molded within said piston body.

3. The piston defined in claim 2 wherein said tang is provided on said inner side wall of said cover.

4. The piston defined in claim 3 wherein said tang extends at an angle relative to said inner side wall of said cover.

5. The piston defined in claim 4 wherein said tang extends at an angle in the range of from 30° to 60°.

6. The piston defined in claim 1 wherein said inner side wall of said cover extends along said inner surface of said piston body a first distance, and said outer side wall of said cover extends along said outer surface of said piston body a second distance which is greater than said first distance.

7. A piston adapted for use in a brake assembly comprising:

a cover formed from a first material, said cover including an end wall having an inner edge and an outer edge, an inner side wall extending from said inner edge, and an outer side wall extending from said outer edge, at least one tang being provided on one of said end wall, said inner side wall, and said outer side wall; and a hollow piston body formed from a second material, said piston body including an open end, a closed end, an inner surface extending between said open end and said closed end, and an outer surface extending between said open end and said closed end, said open end and at least one of said inner surface and said outer surface being integrally molded to said cover such that said end wall of said cover is covered by said open end of said piston body and that at least one of said inner side wall and said outer side wall of said cover is covered by a portion of said one of said inner surface and said outer surface of said piston body, respectively, said tang is molded within said piston body.

8. The piston defined in claim 7 wherein said tang is provided on said inner side wall of said cover.

9. The piston defined in claim 7 wherein said tang extends at an angle relative to said inner side wall of said cover.

10. The piston defined in claim 9 wherein said tang extends at an angle in the range of from 30° to 60°.

11. The piston defined in claim 7 wherein said inner side wall of said cover extends along said inner surface of said piston body a first distance, and said outer side wall of said cover extends along said outer surface of said piston body a second distance which is greater than said first distance.

12. The piston defined in claim 7 wherein said piston is formed from a synthetic resin material and said cover is formed from steel.

13. The piston defined in claim 7 wherein four tangs are provided on said inner side wall of said cover, each of said tangs extending at an angle relative to said inner side wall of said cover.

14. A disc brake caliper assembly comprising:

a rotor adapted to be connected to a vehicle wheel for rotation therewith;

a caliper including an inboard leg, an outboard leg, and an intermediate bridge portion, said inboard leg including a recess formed therein;

a piston slidably disposed in said recess, said piston including a cover formed from a first material, said cover including an end wall having an inner edge and an outer edge, an inner side wall extending from said inner edge, and an outer side wall extending from said outer edge, at least one tang being provided on one of said end wall, said inner side wall, and said outer side wall, said piston further including a hollow piston body formed from a second material, said piston body including an open end, a closed end, an inner surface extending between said open end and said closed end, and an outer surface extending between said open end and said closed end, said open end and at least one of said inner surface and said outer surface being integrally molded to said cover such that said end wall of said cover is covered by said open end of said piston body and that at least one of said inner side wall and said outer side wall of said cover is covered by a portion of said one of said inner surface and said outer surface of said piston body, respectively, said tang is molded within said piston body.

15. The piston defined in claim 14 wherein said tang is provided on said inner side wall of said cover.

16. The piston defined in claim 14 wherein said tang extends at an angle relative to said inner side wall of said cover.

17. The piston defined in claim 16 wherein said tang extends at an angle in the range of from 30° to 60°.

18. The piston defined in claim 14 wherein said inner side wall of said cover extends along said inner surface of said piston body a first distance, and said outer side wall of said cover extends along said outer surface of said piston body a second distance which is greater than said first distance.

19. The piston defined in claim 14 wherein said piston is formed from a synthetic resin material and said cover is formed from steel.

20. The piston defined in claim 14 wherein four tangs are provided on said inner side wall of said cover, each of said tangs extending at an angle relative to said inner side wall of said cover.

* * * * *